United States Patent
Neelakanta et al.

(10) Patent No.: US 9,990,146 B2
(45) Date of Patent: Jun. 5, 2018

(54) APPARATUS AND METHOD OF DATA SEQUENCING

(71) Applicant: SanDisk Technologies LLC, Plano, TX (US)

(72) Inventors: Niranjan Patre Neelakanta, Bangalore (IN); Manavalan Krishnan, Fremont, CA (US); Tomy Ammuthan Cheru, Thrissur (IN); Ramesh Chander, Bangalore (IN); Brian Walter O'Krafka, Austin, TX (US)

(73) Assignee: SanDisk Technologies LLC, Plano, TX (US)

(*) Notice: Subject to any disclaimer, the term of this patent is extended or adjusted under 35 U.S.C. 154(b) by 115 days.

(21) Appl. No.: 15/014,816

(22) Filed: Feb. 3, 2016

(65) Prior Publication Data
US 2017/0220267 A1    Aug. 3, 2017

(51) Int. Cl.
*G06F 12/00* (2006.01)
*G06F 3/06* (2006.01)

(52) U.S. Cl.
CPC .......... *G06F 3/0616* (2013.01); *G06F 3/0631* (2013.01); *G06F 3/0644* (2013.01); *G06F 3/0688* (2013.01)

(58) Field of Classification Search
CPC .... G06F 3/0616; G06F 3/0631; G06F 3/0644; G06F 3/0688
See application file for complete search history.

(56) References Cited

U.S. PATENT DOCUMENTS

| | | | | |
|---|---|---|---|---|
| 5,724,539 | A * | 3/1998 | Riggle | G06F 3/0613 370/468 |
| 7,065,619 | B1 * | 6/2006 | Zhu | G06F 11/1453 707/999.201 |
| 8,396,839 | B1 * | 3/2013 | Huang | G06F 17/30156 707/664 |
| 2011/0276744 | A1 * | 11/2011 | Sengupta | G06F 12/0866 711/103 |
| 2012/0233417 | A1 * | 9/2012 | Kalach | G06F 11/1469 711/162 |
| 2012/0260146 | A1 * | 10/2012 | Lee | G06F 11/1068 714/763 |
| 2015/0193170 | A1 * | 7/2015 | Sundaram | G06F 3/0641 711/103 |
| 2015/0261774 | A1 * | 9/2015 | McFerrin | H04L 67/02 707/803 |
| 2015/0278093 | A1 | 10/2015 | O'Krafka et al. | |
| 2015/0278271 | A1 | 10/2015 | Chander et al. | |
| 2015/0286695 | A1 | 10/2015 | Kadayam et al. | |

* cited by examiner

*Primary Examiner* — Charles Rones
*Assistant Examiner* — Nanci N Wong
(74) *Attorney, Agent, or Firm* — Patterson & Sheridan, LLP; Steven Versteeg (57) ABSTRACT

An apparatus includes a data sequencing engine configured to receive first data and an identification of a first data container associated with the first data and to allocate the first data to a first data stream of multiple data streams based on the identification. The apparatus further includes at least one memory configured to store the first data container. The data sequencing engine is further configured to cause the at least one memory to send data in the first data stream to a flash memory in response to detecting a data size of the first data stream satisfies a threshold.

15 Claims, 7 Drawing Sheets

APPARATUS AND METHOD OF DATA SEQUENCING

FIELD OF THE DISCLOSURE

The present disclosure is generally related to electronic devices and more particularly to data sequencing for an electronic device.

BACKGROUND

Storage devices enable users to store and retrieve data. Examples of storage devices include volatile memory devices and non-volatile memory devices. A non-volatile memory may retain data after a power-down event, and a volatile memory may lose data after a power-down event.

Storage devices may store and access data using a data structure. An example of a data structure is a hierarchical (or "tree") data structure. A hierarchical data structure may indicate that data is to be stored at memory locations indicated by nodes (e.g., leafs) of the hierarchical data structure.

Use of a data structure may result in "random" storage of related data. For example, a logical group of data items may be assigned to non-sequential storage locations. As a result, the logical group of data may be fragmented and small. Certain processes performed at a storage device may read and rewrite the logical group of data, which may cause wear to storage elements of the storage device. An example of wear is a "write amplification" effect. For example, a compaction process to compact the logical group of data may read and rewrite small amounts of data at the storage device, resulting in large block aligned data being written to the storage device multiple times (i.e., a write amplification effect), which may cause wear or damage to the storage elements.

DETAILED DESCRIPTION

An apparatus may include a data sequencing engine that assigns data to one or more data streams and assigns the one or more data streams to a data container. The apparatus may include at least one memory configured to temporarily store (or "accumulate") data for the data container until a data size of data (e.g., a data stream) associated with the data container satisfies a threshold (e.g., until the data stream is "full"). The data sequencing engine may cause the at least one memory to output the data stream to a flash memory in response to detecting that the data size of the data stream satisfies the threshold. As a result, the apparatus may "accumulate" data until the data stream is "full" (and ready to be written to the flash memory), which may reduce or avoid instances of fragmented data at the flash memory. Accordingly, a logical group of data may be "accumulated" and then written to the flash memory using a single write process, which may avoid other data being "mixed" with the logical group of data, thus reducing or avoiding fragmentation at the flash memory.

Particular aspects of the disclosure are described below with reference to the drawings. In the description, common or similar features may be designated by common reference numbers. As used herein, "exemplary" may indicate an example, an implementation, and/or an aspect, and should not be construed as limiting or as indicating a preference or a preferred implementation.

Figure 1:
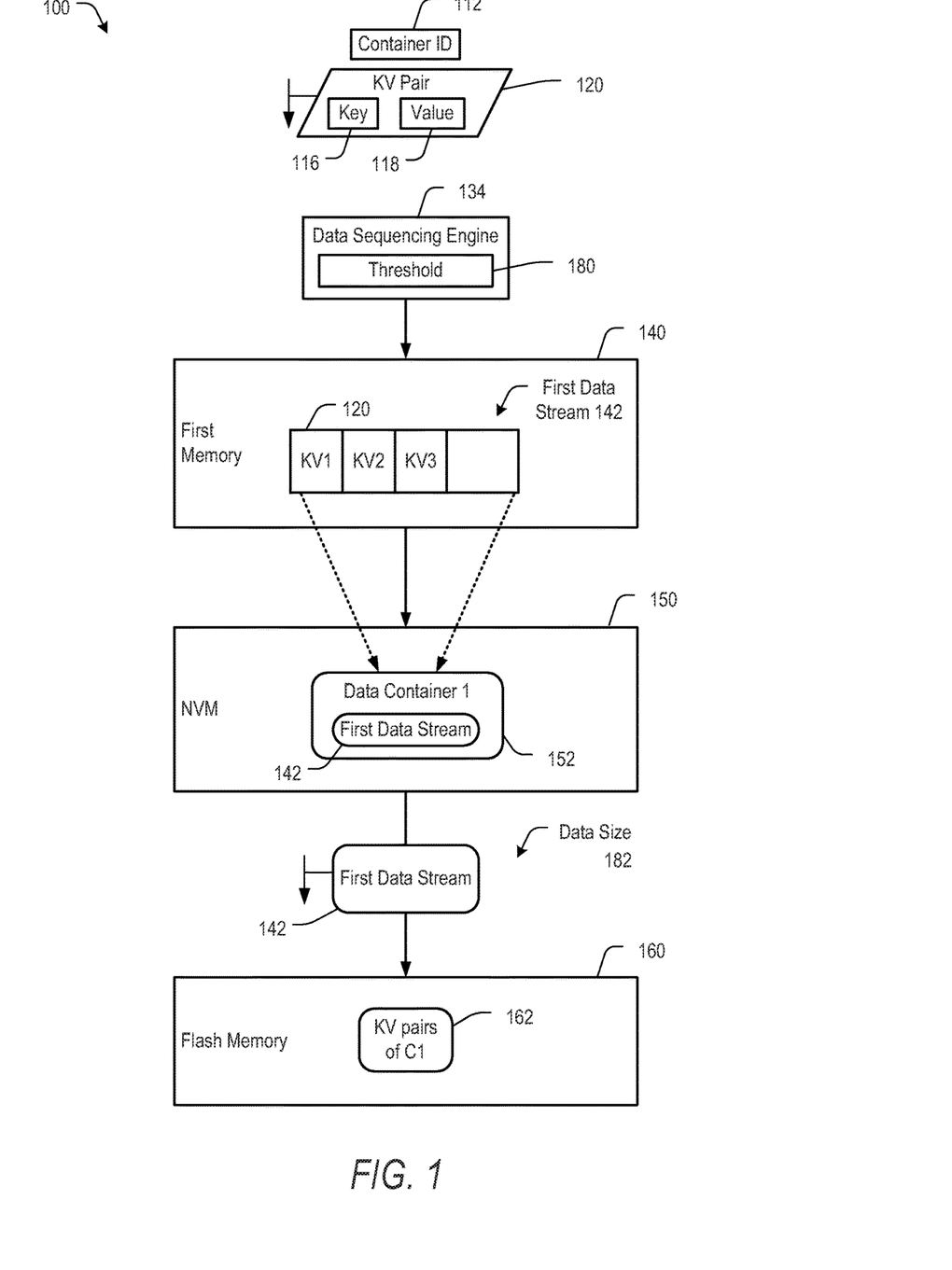
FIG. 1 is a block diagram of a particular illustrative example of a system that includes a data sequencing engine.

Referring to FIG. 1, a particular illustrative example of a system is depicted and generally designated 100. The system 100 includes at least one memory. For example, the system 100 may include a first memory 140 and a second memory, such as a non-volatile memory (NVM) 150.

The NVM 150 may include a non-volatile random access memory (NVRAM), a hard disk drive (HDD), an intermittent non-volatile memory, or another non-volatile memory having a higher write cycle performance than certain flash memory devices, as illustrative examples. For convenience, certain examples are described below with reference to an NVRAM, although it should be appreciated that other memory types may be used instead of or in addition to an NVRAM.

The system 100 also includes a data sequencing engine 134. The data sequencing engine 134 may be coupled to the non-persistent and high speed first memory 140, such as to an input of the first memory 140. The system 100 further includes a non-volatile memory, such as a flash memory 160 (e.g., a persistent flash memory). The flash memory 160 may be coupled to the NVM 150, such as to an output of the NVM 150.

During operation, the data sequencing engine 134 is configured to receive data in connection with execution of an application that is associated with a data structure. An example of a data structure is a key value store. For example, the data sequencing engine 134 may receive first data and an identification of a first data container 152 associated with the first data that are based on the key value store. For example, the data sequencing engine 134 may receive a key value pair 120 and a container identification (ID) 112. The key value pair 120 may include a key 116 and a value 118 (e.g., data that is associated with the key 116).

In some devices, a key value store does not enable identification of logical groups of data. As a result, data may be fragmented, since for example data of multiple logical groups of data may be written in a "mixed" order at a memory device (e.g., instead of writing a first logical group of data to the memory device, then a second logical group of data to the memory device, and so on).

To reduce fragmentation at the flash memory 160 of FIG. 1, the first data container 152 may be a "sequential data container." As used herein, a sequential data container may include key value pairs stored in a sequential order (e.g., instead of randomly ordered key value pairs). The sequential data container may correspond to a logical group of data, such as a particular file or a portion of a file, as an illustrative example. Depending on the particular example or implementation, key value pairs may be received at the data sequencing engine 134 "in order" (e.g., with sequential key values) or "out of order" (e.g., with non-sequential key values).

The data sequencing engine 134 is further configured to allocate the first data (e.g., the key value pair 120) to a first data stream 142. The data sequencing engine 134 may allocate the first data to the first data stream 142 based on the container ID 112.

The first memory 140 may be configured to store (e.g., buffer) data until the data is to be written to the NVM 150. For example, the first memory 140 may store key value pairs of the first data stream 142 until the first data stream 142 is "full" (or until there are no pipelined writes from an application to the same stream). Storing data at the first memory 140 may reduce a number of separate write operations to the NVM 150 (e.g., by enabling a single write operation to write the first data stream 142 to the first memory 140 instead of writing each key value pair of the first data stream 142 to the NVM 150 separately).

The system 100 includes at least one memory configured to store the first data container 152. For example, the NVM 150 is configured to store the first data container 152.

The NVM 150 may include at least one memory that is configured to store a data stream of the first data container 152 until the data sequencing engine 134 causes the NVM 150 to send the data stream in the first data container 152 to the flash memory 160. For example, the data sequencing engine 134 may be configured to cause the NVM 150 to send the first data stream 142 to the flash memory 160 in response to detecting a data size 182 of the first data stream 142 satisfies a threshold 180. For example, the threshold 180 may correspond to a data size that is a positive integer multiple of a logical page size that is associated with write operations at the flash memory 160. Upon writing the first data stream 142 to the flash memory 160, the flash memory 160 may store a set of key value pairs associated with the first data container 152. For example, the flash memory 160 may store key value pairs 162 that are associated with the first data container 152, and the key value pairs 162 may include the key value pair 120. The key value pairs 162 may correspond to the first data stream 142. Storing data in the NVM 150 may reduce writing of smaller data to the flash memory 160. In addition, storing data in the NVM 150 also reduces the number of writes to the flash memory 160.

In a particular illustrative example, the key value pairs 162 are associated with non-sequential addresses, and the key value pairs 162 may be written to sequential addresses of the flash memory 160. For example, keys of the key value pairs 162 may have non-sequential values and may be written to sequential physical addresses of the flash memory 160.

Writing the key value pairs 162 to the sequential addresses of the flash memory 160 may reduce a fragmentation effect at the flash memory 160. As an illustrative example, in case of an event (e.g., a power failure) that interrupts operation of the system 100, a recovery process may include repeating (or "replaying") operations to recover a state (e.g., a state of the NVM 150, a state of the flash memory 160, a state of another memory, or a combination thereof) at the time of (or prior to) the event. Because key value pairs may be written to the flash memory 160 using a sequential technique, repeated copying of the key value pairs (also referred to as write amplification) may be reduced during the recovery process.

Figure 2:
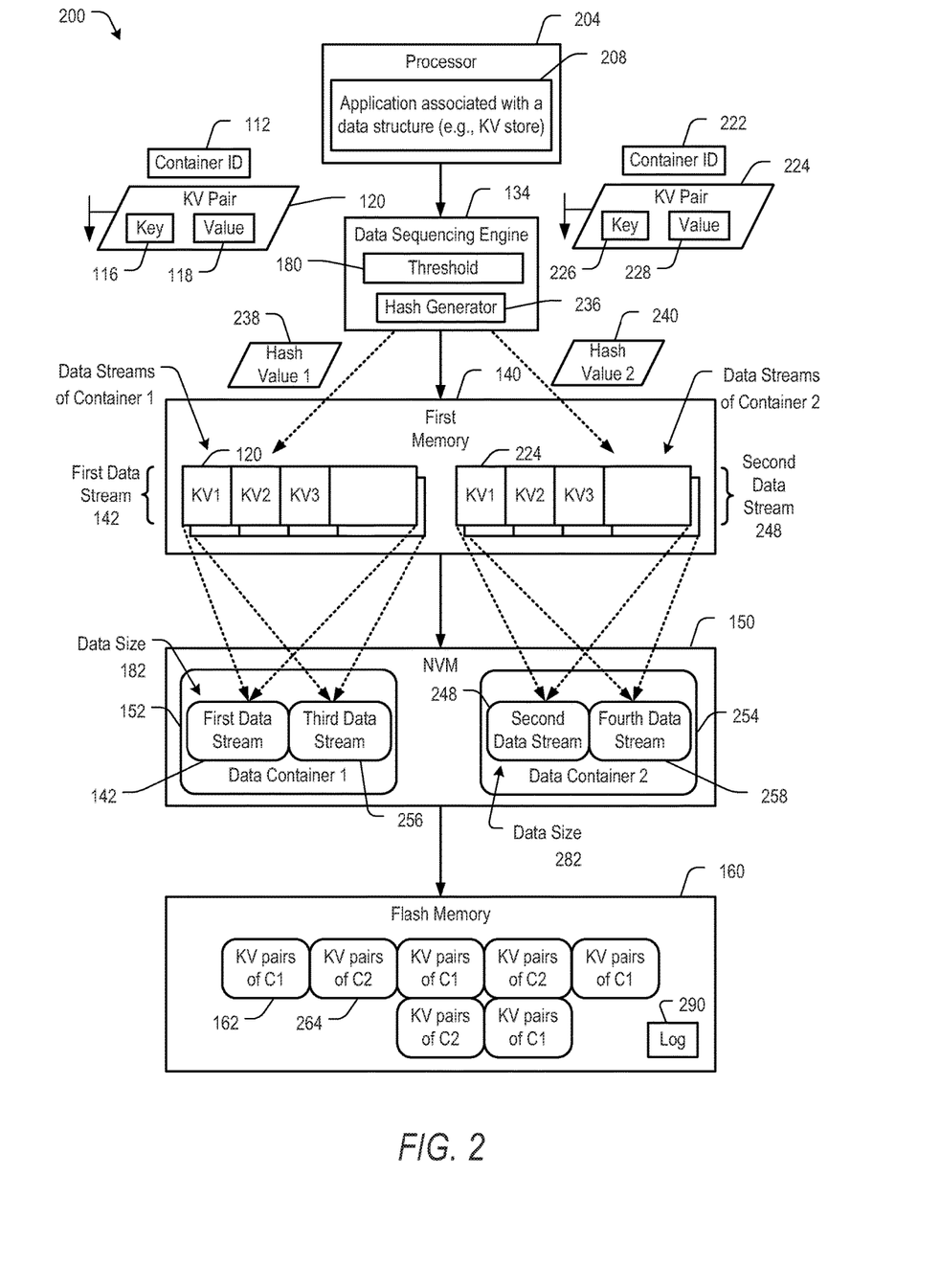
FIG. 2 is a block diagram of another illustrative example of a system that includes the data sequencing engine of FIG. 1.

Referring to FIG. 2, another illustrative example of a system is depicted and generally designated 200. The system 200 may include one or more components described with reference to the system 100 of FIG. 1. For example, the system 200 may include the data sequencing engine 134, the first memory 140, the NVM 150, and the flash memory 160.

The system 200 may further include a processor 204. The processor 204 may be configured to execute an application 208 associated with a data structure. For example, the data structure may include a key value store. As another example, the data structure may comply with a database file format.

FIG. 2 also depicts that the data sequencing engine 134 may include a hash generator 236.

In operation, the hash generator 236 is configured to determine a first hash value 238 of the container ID 112. For example, the hash generator 236 may perform a hash operation based on the container ID 112 to generate the first hash value 238.

In response to receiving a second key value pair 224 and a second data container ID 222, the hash generator 236 may generate a second hash value 240 based on the second data container ID 222. The second key value pair 224 may be received in connection with a second data stream 248. FIG. 2 depicts that the second key value pair 224 may include a key 226 and a value 228 (e.g., data that is associated with the key 226).

The data sequencing engine 134 is configured to allocate data to multiple data streams. For example, the data sequencing engine 134 may be configured to allocate the key value pair 120 to a set of first data streams that are associated with the first data container 152. Further, the data sequencing engine 134 may be configured to allocate the second key value pair 224 to data streams that are associated with a second data container 254. The data sequencing engine 134 may allocate the key value pair 120 to data streams of the first data container 152 based on the first hash value 238, and the data sequencing engine 134 may be configured to allocate the second key value pair 224 to the second data stream 248 based on the second hash value 240.

To further illustrate, the first data container 152 may include the first data stream 142 and a third data stream 256. The data sequencing engine 134 may allocate the first data stream 142 and the third data stream 256 to the first data container 152 based on the first hash value 238. As another example, the data sequencing engine 134 may be configured to allocate the second data stream 248 and a fourth data stream 258 to the second data container 254 based on the second hash value 240.

The data sequencing engine 134 may be configured to cause the NVM 150 to output data of the first data container 152 and data of the second data container 254 to the flash memory 160. For example, the data sequencing engine 134 may be configured to cause the NVM 150 to output the first data stream 142 to the flash memory 160 in response to detecting that the data size 182 of the first data stream 142 satisfies the threshold 180. As another example, the data sequencing engine 134 may be configured to cause the NVM 150 to output the second data stream 248 to the flash memory 160 in response to detecting that a data size 282 of the second data stream 248 satisfies the threshold 180.

After data of the first data container 152 and data of the second data container 254 are output to the flash memory 160, the non-volatile memory may store the key value pairs 162 of the first data container 152. For example, the key value pairs 162 may include the first data stream 142, the third data stream 256, or both. The flash memory 160 may also store key value pairs 264 of the second data container 254. The key value pairs 264 may include the second data stream 248, the fourth data stream 258, or both, as illustrative examples.

To further illustrate certain aspects of the disclosure, the application 208 may be associated with a key value store that provides an application program interface (API) to write data objects (e.g., the values 118, 228) to the flash memory 160. The application 208 may generate, read, update, and delete data objects written to the flash memory 160 by the key value store. The application 208 may use keys (e.g., the keys 116, 226) to identify and access the data objects. The data objects may be grouped (or partitioned) into data containers, such as the data containers 152, 254. A data container may correspond to a logical entity that groups related data objects (e.g., a catalog of related data objects).

Data objects of a data container may be written to memory locations of the flash memory 160 based on a key and based on a data length. For example, a memory location of the flash memory 160 that is to store data objects of first data container 152 may be selected based on the key 116 and a data length of the value 118. The application 208 may track available memory locations of the flash memory 160 and may select one of the available memory locations to store the key value pair 120. The selected memory location may be indicated by data (e.g., a table) stored at the flash memory 160, at the NVM 150, at another memory, or a combination thereof. In response to initiation of a read process to read the data objects, the application 208 may search the data to identify the memory location.

The application 208 may maintain a log 290 in connection with operations performed at the flash memory 160. For example, the operations may be performed on a transactional basis, and the application 208 may use the log 290 to identify incomplete (or uncommitted) transactions that are to be reverted (or "rolled back") in case of certain events that may interrupt a transaction, such as a power failure.

In a particular illustrative example, the key value pairs 162 are associated with non-sequential addresses, and the key value pairs 162 may be written to sequential addresses of the flash memory 160. In some cases, keys of the key value pairs 162 may have non-sequential values and may be written to sequential physical addresses of the flash memory 160. In other cases, the key value pairs 162 may be stored in sequential received order (per data container). The key value pairs 162 may be written to the flash memory 160 after accumulating a "chunk" of key value pairs (e.g., in response to the data size 182 satisfying the threshold 180).

Writing the key value pairs 162 to the sequential addresses of the flash memory 160 may reduce a fragmentation effect at the flash memory 160. As an illustrative example, in case of an event (e.g., a power failure) that interrupts operation of the system 200, a recovery process may include repeating (or "replaying") operations to recover a state (e.g., a state of the NVM 150, a state of the flash memory 160, a state of another memory, or a combination thereof) at the time of (or prior to) the event. The operations may be indicated by the log 290. Because key value pairs may be written to the flash memory 160 using a sequential technique, repeated copying of the key value pairs (also referred to as write amplification) may be reduced during the recovery process.

Figure 3:
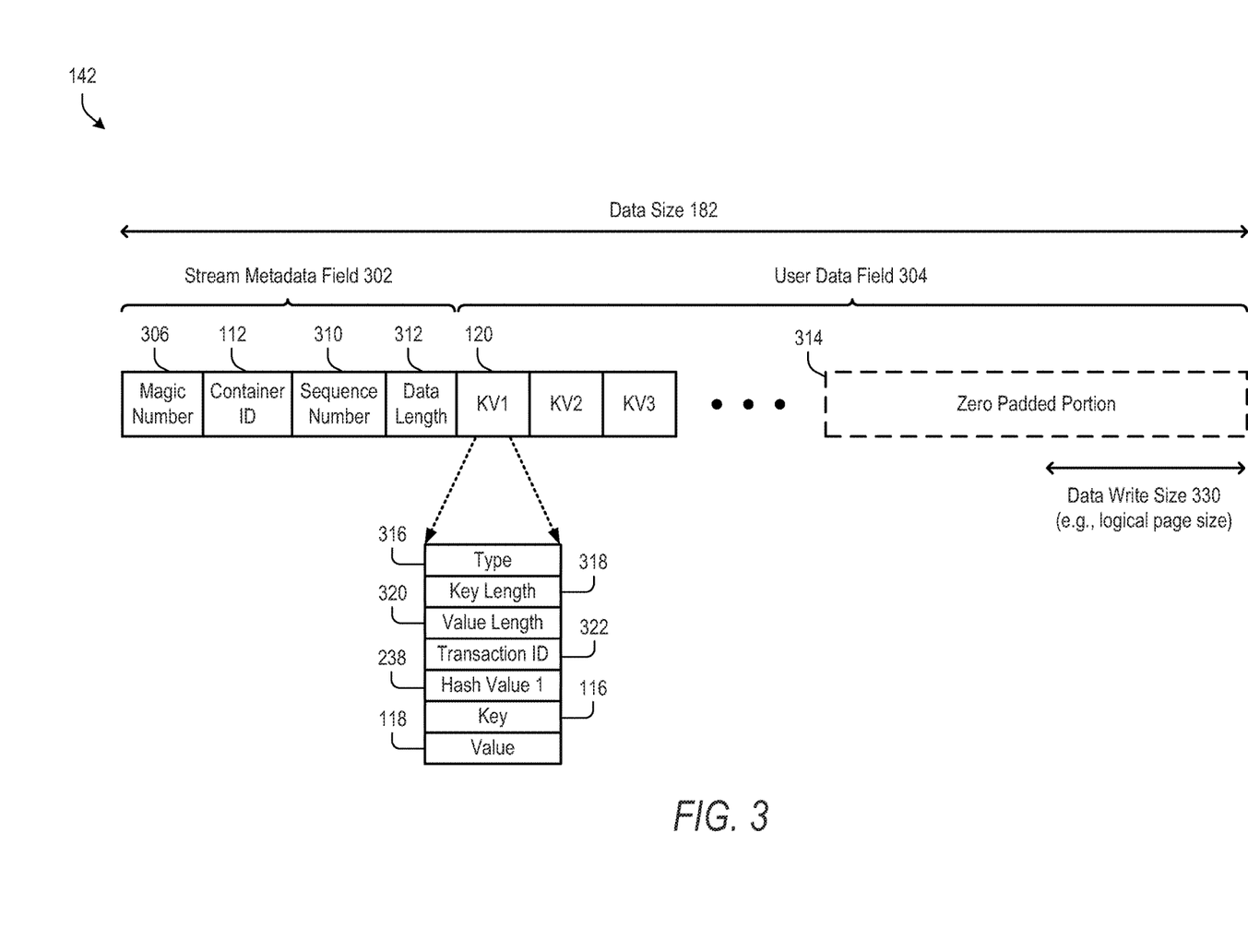
FIG. 3 is a block diagram of an illustrative example of a data stream that may be stored at the system of FIG. 1, the system of FIG. 2, or both.

FIG. 3 depicts a particular illustrative example of the first data stream 142. It should be appreciated that the example of the first data stream 142 described with reference to FIG. 3 is illustrative and that other examples are within the scope of the disclosure. As used herein, a data stream (e.g., the first data stream 142 and the second data stream 248) may include a consecutive array of user written data objects.

The first data stream 142 may include a stream metadata field 302 and a user data field 304. The stream metadata field 302 may include a "magic number" 306, the container ID 112, a sequence number 310, and a data length 312. The user data field 304 may include one or more key value pairs, such as the key value pair 120, and may optionally include a zero padded portion 314.

In an illustrative example, the key value pair 120 includes a type field 316, a key length field 318, a value length field 320, and a transaction ID 322. FIG. 3 also depicts that the key value pair 120 may include the hash value 238, the key 116, and the value 118. FIG. 3 also shows a data write size 330 (e.g., a logical page size of the flash memory 160). The threshold 180 may be a positive integer multiple of the data write size 330. A data size of the first data stream 142 may be a positive integer multiple of the data write size 330.

The zero padded portion 314 may "fill" the first data stream 142 at the NVM 150 while key value pairs (e.g., the key value pair 120) overwrite the zero padded portion 314. In this example, the key value pair 120 may overwrite a portion of the zero padded portion 314 when the key value pair 120 is added to the first data stream 142 at the NVM 150. Alternatively or in addition, the zero padded portion 314 may be added (e.g., by the data sequencing engine 134) to a data stream to "fill" the data stream, such as the first data stream 142. "Filling" the first data stream 142 may enable the data size 182 to satisfy the threshold 180. For example, if a particular key value pair is the last key value pair to be associated with the first data container 152 (e.g., if the particular key value pair includes an "end of container" indication), the data sequencing engine 134 may "fill" a remaining portion of the first data stream 142 to enable the data size 182 to satisfy the threshold 180.

The magic number 306 may identify data objects of the first data container 152. The magic number 306 may be used to determine that the data objects are associated with a sequential data container (e.g., instead of a non-sequential, or "regular," data container).

The container ID 112 may identify a particular sequential data container, such as the first data container 152. For example, the container ID 112 may be accessed in response to a deletion operation to delete data of the first data container 152 (e.g., to enable identification of each stream associated with the first data container 152).

The sequence number 310 may identify an order in which data streams of a data container are written to the flash memory 160. For example, the sequence number 310 may identify that the first data stream 142 is written to the flash memory 160 prior to writing of the third data stream 256 to the flash memory 160. During a read operation to read one or more key value pairs of the first data container 152, the key value pairs of the first data container 152 may be read based on the sequence number 310 (e.g., in increasing order of sequence numbers).

The data length 312 may indicate a length of valid data included in the first data stream 142. The data length 312 may be used to determine an offset within the first data stream 142 at which subsequent key value pairs (if any) are to be written.

The type field 316 may identify an operation, such as a write operation, a delete operation, or a trim operation associated with the key value pair 120. The key length field 318 may indicate a length of the key 116, and the value length field 320 may indicate a length of the value 118. The transaction ID 322 may include information related to a transaction associated with the key value pair 120.

During of operation of the system 200 of FIG. 2, the application 208 may create a data container (e.g., based on a determination that data is to be logically grouped via the data container). In response to the application 208 of FIG. 2 creating (or "opening") a data container, a stream may be created. For example, in response opening the first data container 152, the first data stream 142 may be created, such as by initializing information included in the stream metadata field 302. For example, the sequence number 310 may be associated to the first data stream 142. If the first data stream 142 is an initial data stream associated with first data container 152, then the sequence number 310 may have a value of "0," and the third data stream 256 may be associated with another sequence number having a greater value (e.g., "1").

Data transfer of the first data stream 142 from the NVM 150 to the flash memory 160 may be based on the data write size 330. For example, portions of the first data stream 142 may be provided to (or may be accessed by) the flash memory 160 in portions having data sizes equal to the data write size 330. The first data stream 142 may be associated with a data stream sequence number when the first data stream 142 is written to the flash memory 160 (or when the first data stream 142 is "committed" to the flash memory 160).

To further illustrate certain aspects of the disclosure, it is noted that certain conventional key value stores may enable data object manipulation in a random access manner but may not enable sequential accessing of data objects. Although sequential access may be emulated in some key value stores via a random access interface to simplify certain operations, such an interface does not enable "true" sequential data access. For example, performance of a device that uses emulated sequential access of data objects may be similar to performance using random access of data objects.

Certain conventional key value stores may not include functionality to differentiate sequential data objects from random (or pseudo-random) data objects. As a result, sequential application metadata (e.g., metadata included in multiple key value pairs of a particular data stream, such as the first data stream 142) may be stored as random objects, which may increase write-amplification and which may reduce device performance. Certain log structured merge (LSM) tree key value stores may enable emulation of sequential access using random access methods (e.g., by serializing writes to a log). LSM tree key value stores may include a relatively complex read path that may reduce device performance and that may be associated with write amplification.

Further, LSM tree key value stores may write received key value pairs based on an order in which the key value pairs are received. In response to a data size of the written data being relatively large, a compaction process may be performed to consolidate data or to remove redundant data. Because the key value pairs may be stored non-sequentially (e.g., in the order in which the key value pairs are received), the compaction process may be associated with a relatively high write amplification effect. In addition, LSM tree key value stores may use a single file for all writes to a data container, and the file may grow to a large size. To read a particular key, the whole file may be read, resulting in high latency. The file may include an operation log (e.g., the log 290) that is accessed, updated, and edited (e.g., truncated) by an application.

A device in accordance with the disclosure (e.g., the system 100, the system 200, or both) may use sequential access in connection with a key value store and may utilize an implementation scheme that is based on the sequential access. The device may use sequential access to group (or "batch") multiple accesses, which may reduce input/output operations per second (IOPs) and reduce write-amplification. In illustrative implementation, the device uses a key value store to persist log records as part of a crash-recovery (e.g., "backup") process. As a particular illustrative example, a distributed block/object/file store may be implemented in layers, and one of the layers may include a key/value store (e.g., as a backend portion of the layer). To increase durability after shutdowns or crashes, operations (e.g., write operations) to the flash memory 160 may be recorded to a sequential log (e.g., to the log 290 by the processor 204 during execution of the application 208) that is implemented using a store functionality (or "store layer") of the key value store. The log may be stored at the NVM 150, the flash memory 160, another memory, or a combination thereof.

In the event of a crash, a recovery process may include repeating (or "replaying") operations indicated by the log 290 to recover a state (e.g., a state of the NVM 150, a state of the flash memory 160, a state of another memory, or a combination thereof) at the time of (or prior to) the crash. Because the key value pairs 162, 164 may be written to the flash memory 160 using a sequential technique, repeated copying of the key value pairs 162, 164 (also referred to as write amplification) may be reduced during the recovery process.

In some cases, a device or method described herein may be implemented using processor-executable instructions and using a server with direct-attached or remote-attached storage. Alternatively or in addition, a device or method described herein may be implemented using hardware or some combination of hardware/firmware/embedded code within a storage device or storage appliance.

The application 208 may write data to the flash memory 160 based on a sequential container technique. The sequential container technique may use the NVM 150 to accumulate data objects (e.g., key value pairs) and may write the data objects as a "chunk" (e.g., as a data stream of a sequential data container) to the flash memory 160 in response to detecting that a size of the "chunk" satisfies the threshold 180. In this case, certain operations described with reference to the data sequencing engine 134 may be performed by the processor 204 during execution of the application 208.

In response to determining to write a data object to the flash memory 160, the data object may be temporarily stored in a backing store (e.g., at the NVM 150) instead of writing the data object directly to the flash memory 160, as in certain conventional key value stores. One or more additional data objects may be accumulated at the backing store until a data size of the accumulated data objects (e.g., key value pairs) satisfies the threshold 180. The data objects may be stored at the backing store sequentially. For example, key value pairs of the first data container 152 may be stored in a first portion (e.g., a first partition) of the NVM 150, and key value pairs of the second data container 254 may be stored in a second portion (e.g., a second partition) of the NVM 150 that is separate from the first portion. A data container may be associated with a data container key (e.g., a "master" key that is associated with each key of the data container). Thus, writing of key values of a data container may be "bundled" together based on the data container key. A transactional mechanism may be used to "roll back" operations of incomplete transactions (e.g., due to a system crash).

An illustrative write operation may include determining a data stream associated with a key value pair (e.g., the key value pair 120). The key value pair may be stored at the first memory 140 and added to a data stream of the NVM 150 until a group of key value pairs is collected at the first memory 140 and the NVM 150. The group of key value pairs may be written from the NVM 150 (e.g., as the first data stream 142) to the flash memory 160.

An update operation may include updating a data stream. For example, a key value pair may be added to the first data stream 142 by adding a key and updated data to the first data stream 142 while the first data stream 142 is stored at the NVM 150.

A delete operation may include inserting a delete entry to data. For example, the data length 312 may be "zeroed" out to indicate the first data stream 142 is invalid. As another example, the key length field 318 may be "zeroed out" to indicate the key value pair 120 is invalid.

A read operation may include reading each data stream associated with a particular data container to be read. For example, to read the first data container 152, each data stream indicating the container ID 112 may be read from the flash memory 160. In some implementations, one or more other data streams (if any) associated with the container ID 112 may be read from the NVM 150. Upon reading a key, if no delete entry exists for the key, the key may be returned to complete the read operation. Alternatively, if a delete entry is the sequentially last entry that exists for the key, an error may be returned (indicating the key is invalid).

A trim operation may include deleting data (or "records") that are written before a particular key is written. The application 208 may initiate a trim operation associated with a particular key and a particular data container. The trim operation may include writing a trim indication (e.g., a flag) of the trim operation into a data stream. After writing the trim indication, the trim operation may be triggered by one or more events. The one or more events may include opening of a data container, detecting that available memory space of the flash memory 160 is less than a threshold, or determining that a particular time interval has elapsed, as illustrative, non-limiting examples. Upon detection of the trim indication, a sequence number (e.g., the sequence number 310) may be identified. Each data stream having keys that are less than the sequence number may be deleted (e.g., to delete earlier written data streams). During a read of a key, the most recent trim indicator may be identified. The key may be returned if the key was written later than the most recent trim indicator.

Certain operations at the system 100 or the system 200 may be performed on a transactional basis. Transactional operations may be initiated (or "opened") and then completed (or "committed"). Each transactional operation may be associated with a corresponding transaction ID. For example, a transaction associated with the key value pair 120 may be associated with the transaction ID 322.

During a transaction open operation, a transaction ID may be generated. The transaction ID may be written with other data objects written as part of the transaction open operation. In response to a transaction commit operation, the log 290 may be updated to indicate the transaction has been committed and that each of the operations of the transaction are complete. Alternatively, if a failure or other event is detected prior to commitment of the transaction, each of the operations of the transaction may be aborted (or "rolled back"). Data objects of a sequential container may be part of transaction (and may be "rolled back" in this case). If a data object is written to a sequential container, a record for the data object may have the transaction ID set in a header portion of a key value pair. For example, the key value pair 120 may indicate the transaction ID 322.

When a data container is opened or the application 208 initiates a key value store, entries of the log 290 may be searched and uncommitted transactions may be identified using the log 290. After identifying the uncommitted transactions, data objects of the container may be read (e.g., both in the NVM 150 and the flash memory 160). If a data object is included in an uncommitted transaction, the data object may be reverted (or "rolled back"). The data object may be marked as invalid (or void) and may be overwritten or invalidated. If the data object is read after being overwritten or invalided, an error may be returned.

Figure 4:
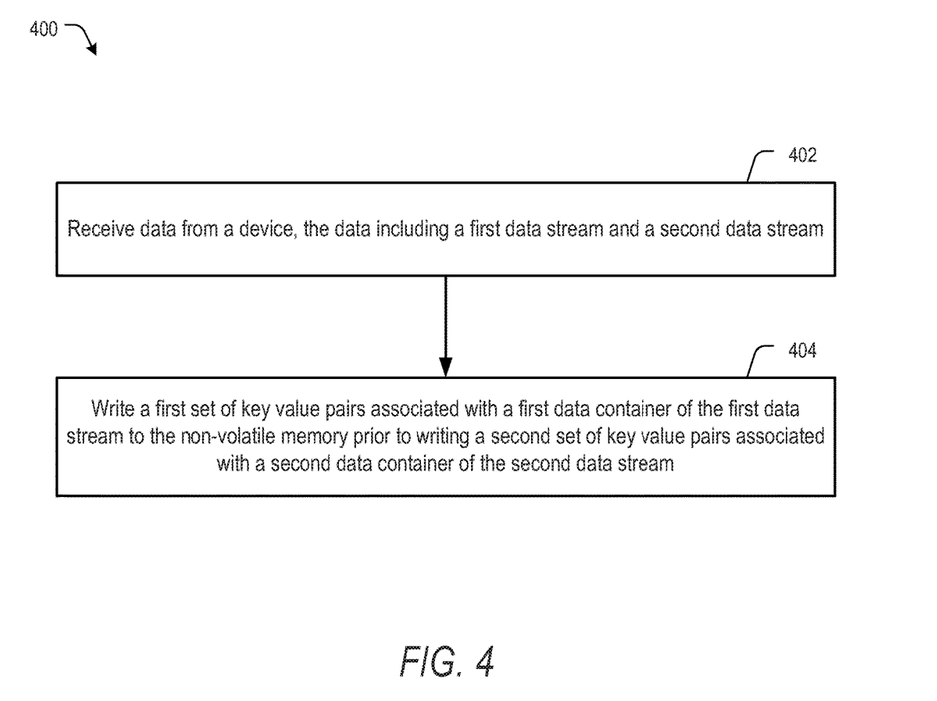
FIG. 4 is a flow chart of a particular illustrative embodiment of a method of operation of a data storage device.

Referring to FIG. 4, a particular illustrative example of a method is depicted and generally designated 400. The method 400 may be performed at a data storage device that includes a non-volatile memory, such as at the non-volatile memory system 502 of FIG. 5 and the flash memory 160.

The method 400 includes receiving data from a device, at 402. The data includes a first data stream and a second data stream. For example, the flash memory 160 may receive the first data stream 142 and the second data stream 248 from the NVM 150 (e.g., an NVRAM). The first data stream may be received from the device at a first time, and the second data stream may be received from the device at a second time that is after the first time (the first data stream and the second data stream may be received sequentially).

The method 400 further includes writing a first set of key value pairs associated with a first data container of the first data stream to the non-volatile memory prior to writing a second set of key value pairs associated with a second data container of the second data stream, at 404. For example, the first set of key value pairs may correspond to the key value pairs 162, and the second set of key value pairs may include the second key value pairs 264. The first data container may correspond to the first data container 152, and the second data container may correspond to the second data container 254.

In an illustrative example, each of the first set of key value pairs indicates a first sequence number (e.g., the sequence number 310), and each of the second set of key value pairs indicates a second sequence number. The data may be written to the non-volatile memory in a sequence that is based on a data structure (e.g., a hierarchical data structure), and the sequence may correspond to an order of the first sequence number and the second sequence number. The data structure may include a key value store, as an illustrative example.

The received data may be associated with non-sequential addresses, and the data may be written to sequential addresses of the non-volatile memory. For example, keys of the key value pairs 162 may have non-sequential values and may be written to sequential physical addresses of the flash memory 160. As another example, keys of the key value pairs 264 may have non-sequential values and may be written to sequential physical addresses of the flash memory 160.

Writing the data to the sequential addresses may reduce a fragmentation effect at the non-volatile memory. For example, writing the data to the sequential addresses may avoid one or more copy operations to rearrange the data.

Figure 5:
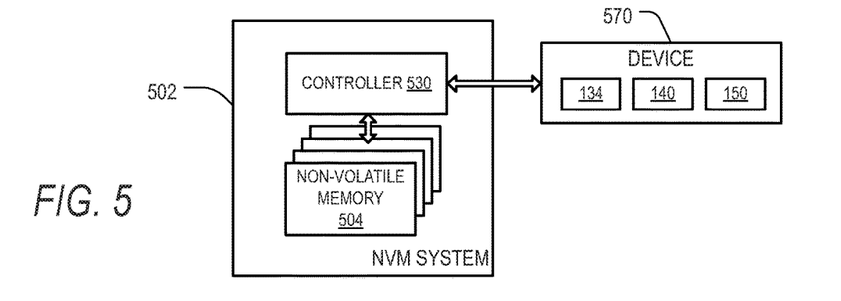
FIG. 5 is a block diagram of a particular illustrative embodiment of a non-volatile memory system.

Referring to FIG. 5, a non-volatile memory system 502 (e.g., a data storage device) may be coupled to a device 570 (e.g., a host device or an access device). The non-volatile memory system 502 includes a controller 530 and non-volatile memory that may be made up of one or more non-volatile memory dies 504. As used herein, the term "memory die" refers to the collection of non-volatile memory cells, and associated circuitry for managing the physical operation of those non-volatile memory cells, that are formed on a single semiconductor substrate. The non-volatile memory dies 504 may include one or more memories corresponding to the flash memory 160. The controller 530 interfaces with the device 570 and transmits command sequences for read, program, and erase operations to the one or more non-volatile memory dies 504.

The controller 530 (which may be a flash memory controller) may take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 530 may be configured with hardware and/or firmware to perform the various functions described below and shown in the flow diagrams. Also, some of the components shown as being internal to the controller 530 can be stored external to the controller 530, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory, map out bad flash memory cells, and allocate spare cells to be substituted for future failed cells. Some part of the spare cells can be used to hold firmware to operate the flash memory controller and implement other features. In operation, when a host device is to read data from or write data to the flash memory, the host device communicates with the flash memory controller. If the host device provides a logical address to which data is to be read/written, the flash memory controller can convert the logical address received from the host device to a physical address in the flash memory. (Alternatively, the host device can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The one or more non-volatile memory dies 504 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between the controller 530 and the one or more non-volatile memory dies 504 may be any suitable flash interface, such as Toggle Mode. In one embodiment, the non-volatile memory system 502 may be a card based system, such as a secure digital (SD) or a micro secure digital (micro-SD) card. In an alternate embodiment, the non-volatile memory system 502 may be part of an embedded memory system.

Although, in the example illustrated in FIG. 5, the non-volatile memory system 502 (sometimes referred to herein as a storage module) includes a single channel between the controller 530 and the one or more non-volatile memory dies 504, the subject matter described herein is not limited to having a single memory channel. For example, in some NAND memory system architectures, 2, 4, 8 or more NAND channels may exist between the controller 530 and the NAND memory device, depending on controller capabilities. In any of the embodiments described herein, more than a single channel may exist between the controller 530 and the one or more non-volatile memory dies 504, even if a single channel is shown in the drawings.

Figure 6:
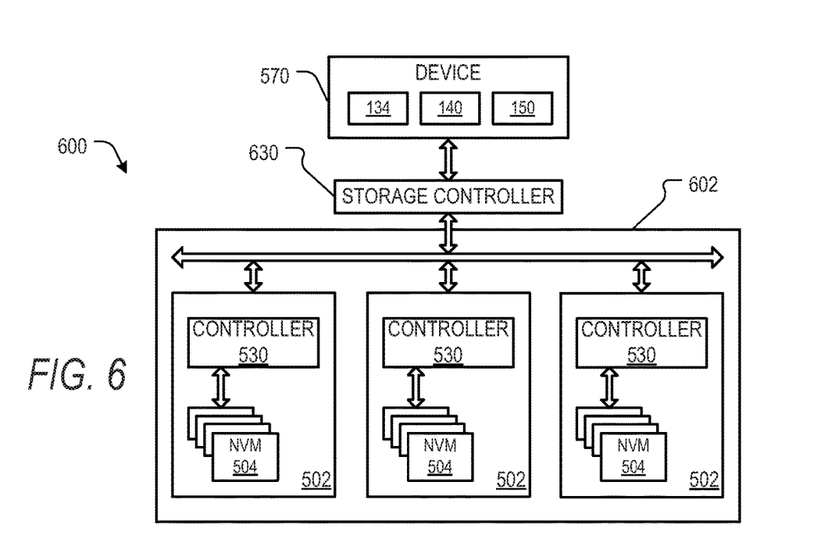
FIG. 6 is a block diagram of a particular illustrative embodiment of a storage system including a plurality of the non-volatile memory systems of FIG. 5.

FIG. 6 illustrates a storage system 600 that includes multiple non-volatile memory systems 502. As such, storage system 600 may include a storage controller 630 that interfaces with the device 570 (e.g., a host device) and with a storage system 602, which includes a plurality of non-volatile memory systems 502. The interface between the storage controller 630 and the non-volatile memory systems 502 may be a bus interface, such as a serial advanced technology attachment (SATA) or peripheral component interface express (PCIe) interface. The storage system 600 may correspond to a solid state drive (SSD), such as found in portable computing devices, such as laptop computers, and tablet computers.

Figure 7:
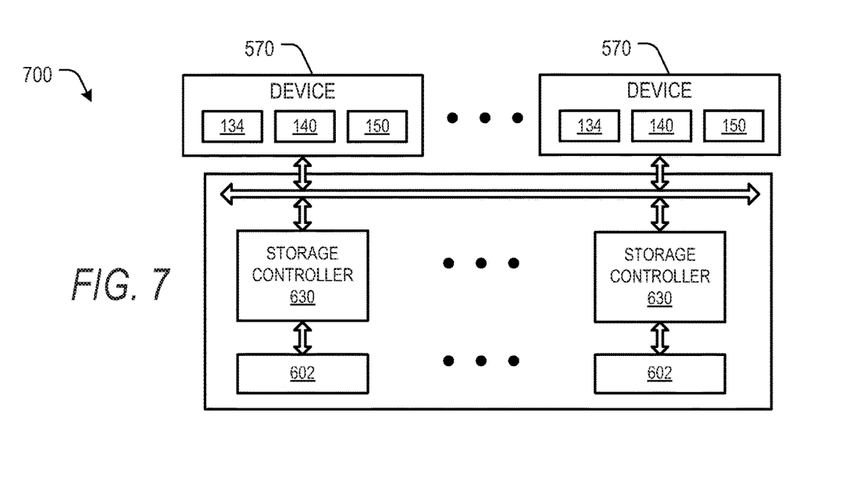
FIG. 7 is a block diagram of a particular illustrative embodiment of a hierarchical storage system.

FIG. 7 is a block diagram illustrating a hierarchical storage system 700. The hierarchical storage system 700 includes a plurality of storage controllers 630, each of which controls a respective storage system 602. Devices 570 (e.g., one or more host devices or accessing devices) may access memories within the hierarchical storage system 700 via a bus interface. In one embodiment, the bus interface may be an NVMe or fiber channel over Ethernet (FCoE) interface. In one embodiment, the hierarchical storage system 700 illustrated in FIG. 7 may be a rack mountable mass storage system that is accessible by multiple host computers, such as would be found in a data center or other location where mass storage is needed.

Figure 8:
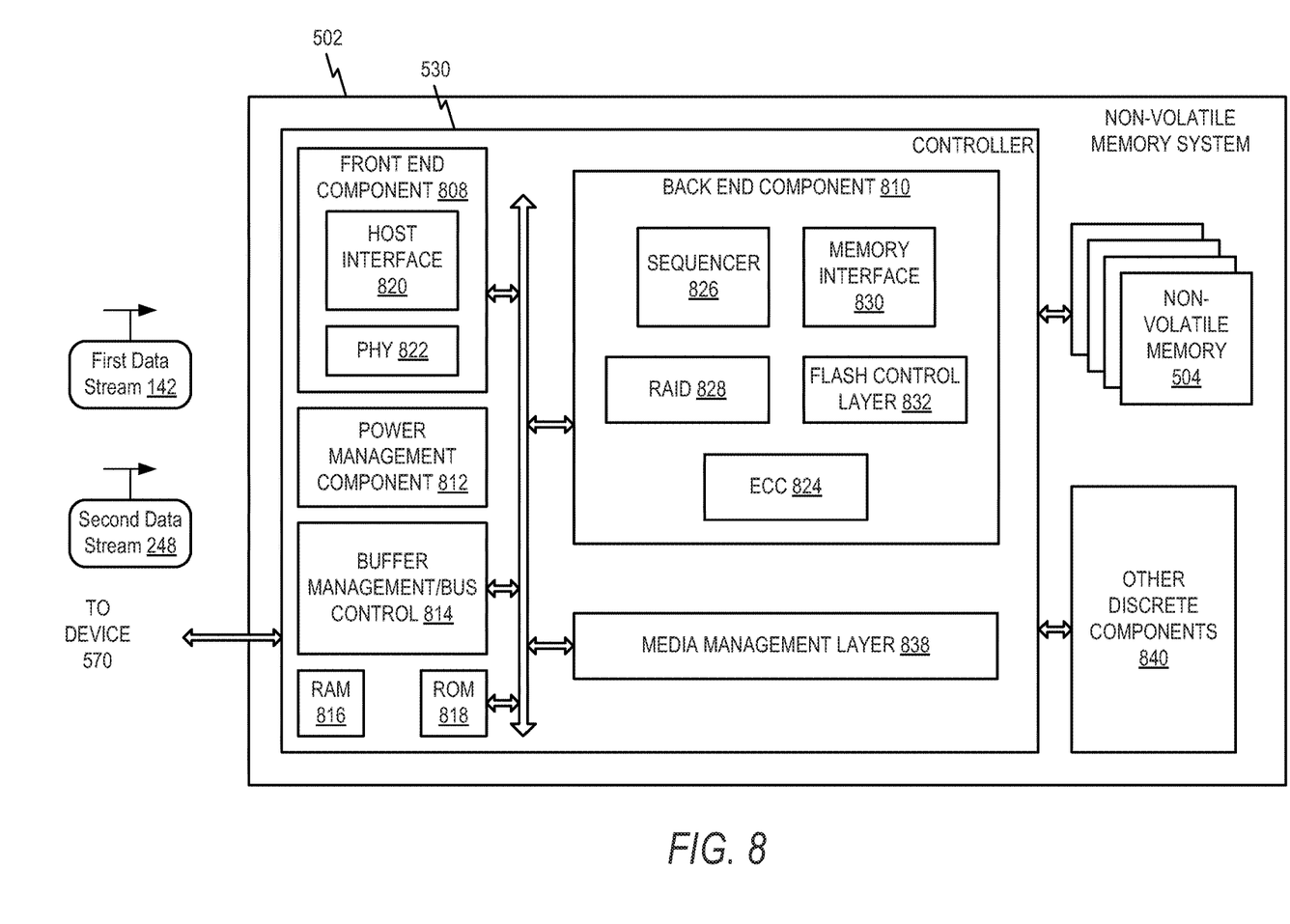
FIG. 8 is a block diagram of a memory system and depicts components of a particular illustrative embodiment of a controller.

FIG. 8 is a block diagram illustrating exemplary components of the controller 530 of the non-volatile memory system 502 in more detail. The controller 530 also includes a front end component 808 that interfaces with a host device, a back end component 810 that interfaces with the one or more non-volatile memory dies 504, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to the controller 530, a buffer manager/bus controller 814 manages buffers in random access memory (RAM) 816 and controls the internal bus arbitration of the controller 530. A read only memory (ROM) 818 stores system boot code. Although illustrated in FIG. 8 as located within the controller 530, in other embodiments one or both of the RAM 816 and the ROM 818 may be located externally to the controller 530. In yet other embodiments, portions of RAM and ROM may be located both within the controller 530 and outside the controller 530.

Front end component 808 includes a host interface 820 and a physical layer interface (PHY) 822 that provide the electrical interface with the host device or next level storage controller. The choice of the type of host interface 820 can depend on the type of memory being used. Examples of host interfaces 820 include, but are not limited to, SATA, SATA Express, SAS, Fibre Channel, USB, PCIe, and NVMe. The host interface 820 typically facilitates transfer for data, control signals, and timing signals.

Back end component 810 includes an error correcting code (ECC) engine 824 that encodes the data received from the host device, and decodes and error corrects the data read from the non-volatile memory. A command sequencer 826 generates command sequences, such as program and erase command sequences, to be transmitted to the one or more non-volatile memory dies 504. A RAID (Redundant Array of Independent Drives) component 828 manages generation of RAID parity and recovery of failed data. The RAID parity may be used as an additional level of integrity protection for the data being written into the one or more non-volatile memory dies 504. In some cases, the RAID component 828 may be a part of the ECC engine 824. A memory interface 830 provides the command sequences to non-volatile memory die 504 and receives status information from the one or more non-volatile memory dies 504. For example, the memory interface 830 may be a double data rate (DDR) interface, such as a Toggle Mode interface. A flash control layer 832 controls the overall operation of back end component 810.

Additional components of the non-volatile memory system 502 illustrated in FIG. 8 include a power management component 812 and a media management layer 838, which performs wear leveling of memory cells of the one or more non-volatile memory dies 504. The non-volatile memory system 502 may also include one or more other components or features described herein. Non-volatile memory system 502 also includes other discrete components 840, such as external electrical interfaces, external RAM, resistors, capacitors, or other components that may interface with the controller 530. In alternative embodiments, one or more of the physical layer interface 822, RAID component 828, media management layer 838 and buffer management/bus controller 814 are optional components that are omitted from the controller 530.

Figure 9:
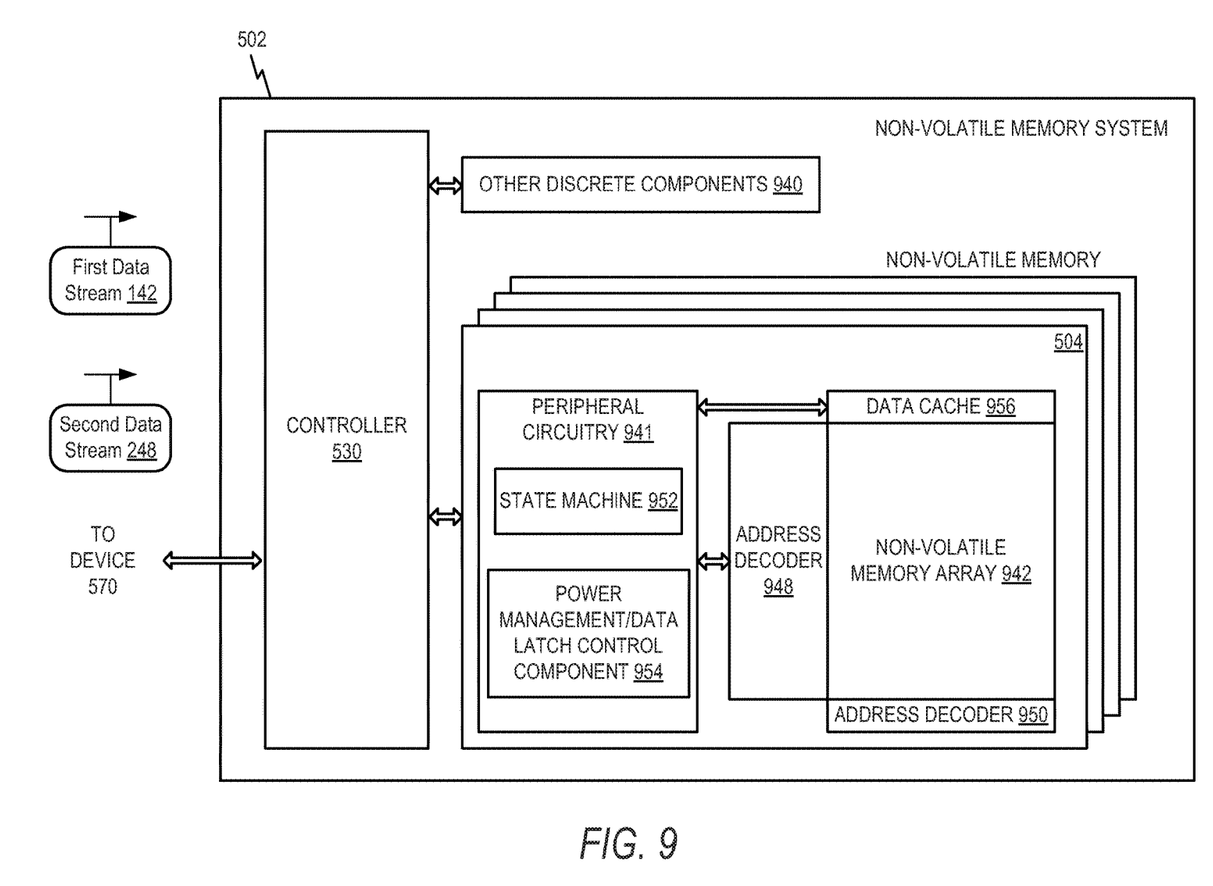
FIG. 9 is a block diagram of a memory system and depicts components of a particular illustrative embodiment of a non-volatile memory die.

FIG. 9 is a block diagram illustrating exemplary components of the one or more non-volatile memory dies 504 of the non-volatile memory system 502 in more detail. The one or more non-volatile memory dies 504 include peripheral circuitry 941 and a non-volatile memory array 942. The non-volatile memory array 942 includes the non-volatile memory cells used to store data. The non-volatile memory cells may be any suitable non-volatile memory cells, including NAND flash memory cells and/or NOR flash memory cells in a two dimensional and/or three dimensional configuration. The peripheral circuitry 941 includes a state machine 952 that provides status information to the controller 530. The peripheral circuitry 941 may also include a power management or data latch control component 954. The one or more non-volatile memory dies 504 further include discrete components 940, an address decoder 948, an address decoder 950, and a data cache 956 that caches data.

A data storage device (e.g., the non-volatile memory system 502) may include a controller (e.g., the controller 530) configured to receive data (e.g., from a device (e.g., the device 570). The data includes a first data stream (e.g., the first data stream 142) and a second data stream (e.g., the second data stream 248). The data storage device further includes a non-volatile memory (e.g., the flash memory 160) coupled to the controller. The non-volatile memory is configured to write a first set of key value pairs associated with a first data container of the first data stream prior to writing a second set of key value pairs associated with a second data container of the second data stream. For example, the first set of key value pairs may correspond to the key value pairs 162, and the second set of key value pairs may include the second key value pairs 264. The first data container may correspond to the first data container 152, and the second data container may correspond to the second data container 254.

Although various components depicted herein are illustrated as block components and described in general terms, such components may include one or more microprocessors, state machines, or other circuits configured to enable such components to perform one or more operations described herein. For example, the data sequencing engine 134 may represent physical components, such as hardware controllers, state machines, logic circuits, or other structures, that are configured to perform operations described herein.

Alternatively or in addition, the data sequencing engine 134 may be implemented using a microprocessor or microcontroller programmed to perform data sequencing operations. In a particular embodiment, the data sequencing engine 134 includes a processor executing instructions (e.g., firmware) that are stored at the flash memory 160. Alternatively, or in addition, executable instructions that are executed by the processor may be stored at a separate memory location that is not part of the flash memory 160, such as at a read-only memory (ROM).

The non-volatile memory system 502 may be coupled to, attached to, or embedded within one or more accessing devices, such as within a housing of the device 570. For example, the non-volatile memory system 502 may be embedded within the device 570 in accordance with a Joint Electron Devices Engineering Council (JEDEC) Solid State Technology Association Universal Flash Storage (UFS) configuration. To further illustrate, the non-volatile memory system 502 may be integrated within an electronic device (e.g., the device 570), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the non-volatile memory system 502 may be implemented in a portable device configured to be selectively coupled to one or more external devices, such as a host device. For example, the non-volatile memory system 502 may be removable from the device 570 (i.e., "removably" coupled to the device 570). As an example, the non-volatile memory system 502 may be removably coupled to the device 570 in accordance with a removable universal serial bus (USB) configuration.

The device 570 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The device 570 may communicate via a controller, which may enable the device 570 to communicate with the non-volatile memory system 502. The device 570 may operate in compliance with a JEDEC Solid State Technology Association industry specification, such as an embedded MultiMedia Card (eMMC) specification or a Universal Flash Storage (UFS) Host Controller Interface specification. The device 570 may operate in compliance with one or more other specifications, such as a Secure Digital (SD) Host Controller specification as an illustrative example. Alternatively, the device 570 may communicate with the non-volatile memory system 502 in accordance with another communication protocol. In some implementations, the non-volatile memory system 502 may be integrated within a network-accessible data storage system, such as an enterprise data system, an NAS system, or a cloud data storage system, as illustrative examples.

In some implementations, the non-volatile memory system 502 may include a solid state drive (SSD). The non-volatile memory system 502 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the non-volatile memory system 502 may be coupled to the device 570 via a network. For example, the network may include a data center storage system network, an enterprise storage system network, a storage area network, a cloud storage network, a local area network (LAN), a wide area network (WAN), the Internet, and/or another network.

To further illustrate, the non-volatile memory system 502 may be configured to be coupled to the device 570 as embedded memory, such as in connection with an embedded MultiMedia Card (eMMC®) (trademark of JEDEC Solid State Technology Association, Arlington, Va.) configuration, as an illustrative example. The non-volatile memory system 502 may correspond to an eMMC device. As another example, the non-volatile memory system 502 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The non-volatile memory system 502 may operate in compliance with a JEDEC industry specification. For example, the non-volatile memory system 502 may operate in compliance with a JEDEC eMMC specification, a JEDEC Universal Flash Storage (UFS) specification, one or more other specifications, or a combination thereof.

The non-volatile memory die 504 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. In a particular embodiment, the non-volatile memory system 502 is indirectly coupled to an accessing device (e.g., the device 570) via a network. For example, the non-volatile memory system 502 may be a network-attached storage (NAS) device or a component (e.g., a solid-state drive (SSD) component) of a data center storage system, an enterprise storage system, or a storage area network. The flash memory 160 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising: at a data storage device that includes a non-volatile memory, performing:
   receiving data from a device, the data including a first data stream and a second data stream; wherein each of the data stream includes a metadata field and a user data field; the metadata field includes at least a magic number identifying data objects associated with a sequential data container, a container ID identifying the sequential data container, and a sequence number identifying an order of a plurality of containers within a data stream is written to a non-volatile memory; the user data field includes one or more key values pairs; and
   writing a first set of key value pairs associated with a first data container identified by the container ID of the first data stream to the non-volatile memory prior to writing a second set of key value pairs associated with a second data container identified by the container ID of the second data stream, wherein the key value pairs are written to the non-volatile memory in a sequence that is based on the metadata field; and if the key value pairs received are associated with non-sequential addresses, the key value pairs are written to the non-volatile memory in sequential address.

2. The method of claim 1, wherein the received data has a data structure, and wherein the data structure is based on a key value store or a database file format.

3. The method of claim 1, wherein the non-volatile memory includes a persistent flash memory; wherein the received data is associated with non-sequential addresses, and the data is written to sequential addresses of the persistent flash memory.

4. The method of claim 3, wherein writing the data to the sequential addresses reduces a fragmentation effect by avoiding one or more copy operations to rearrange the data.

5. The method of claim 1, wherein the first data stream is received from the device at a first time, and wherein the second data stream is received from the device at a second time that is after the first time.

6. A device comprising:
   a controller configured to receive data from a device, the data including a first data stream and a second data stream; wherein each of the data stream includes a metadata field and a user data field; the metadata field includes at least a magic number identifying data objects associated with a sequential data container, a container ID identifying a respective sequential data container, and a sequence number identifying an order of a plurality of containers within a data stream is written to a non-volatile memory; the user data field includes one or more key values pairs;

the non-volatile memory coupled to the controller, the non-volatile memory configured to write a first set of key value pairs associated with a first data container identified by the container ID of the first data stream prior to writing a second set of key value pairs associated with a second data container identified by the container ID of the second data stream, wherein the non-volatile memory includes a persistent flash memory, wherein the controller is configured to write the key value pairs to the persistent flash memory in a sequence that is based on the metadata field; and if the key value pairs received are associated with non-sequential addresses, the key value pairs are written to the persistent flash memory in sequential address.

7. The device of claim 6 wherein the received data has a data structure, and wherein the data structure is based on a key value store or a database file format.

8. An apparatus comprising:

a data sequencing engine configured to receive first data and an identification of a first data container associated with the first data and to allocate the first data to a first data stream of multiple data streams based on the identification;

at least one memory configured to store the first data container, the data sequencing engine includes a hash generator configured to determine a hash of the identification of the first data container and to assign a first key value pair of the first data to the first data stream based on the hash;

wherein the first data stream comprises a metadata field and a user data field;

the metadata field includes at least a magic number identifying data objects associated with a sequential data container, the first data container identification identifying the sequential data container, and a sequence number identifying an order of a plurality of containers within the first data stream to be written to a persistent non-volatile memory; the user data field includes at least the first key values pair; and the data sequence engine is further configured to cause the at least one memory to send the first data stream within the first data container to the non-volatile memory in response to detecting a data size of the first data stream satisfies a threshold.

9. The apparatus of claim 8, wherein the data sequencing engine is further configured to allocate second data to a second data stream of the multiple data streams.

10. The apparatus of claim 9, wherein the data sequencing engine is further configured to cause the at least one memory to send the second data to the non-volatile memory in response to detecting a data size of a second data container satisfies the threshold.

11. The apparatus of claim 8, wherein the at least one memory includes a first memory and wherein the non-volatile memory (NVM) is coupled to the first memory.

12. The apparatus of claim 8, wherein the first data stream includes a metadata field and a user data field, wherein the user data field includes a zero padded portion to enable the data size to satisfy the threshold.

13. The apparatus of claim 12, wherein the threshold is a positive integer multiple of a logical page size associated with the non-volatile memory.

14. The apparatus of claim 8, wherein the non-volatile memory comprises a persistent flash memory.

15. The apparatus of claim 8, wherein the first data has a data structure, and wherein the data structure is based on one or more of a key value store or a database file format.

* * * * *